United States Patent [19]

Chattha et al.

[11] 4,259,472

[45] Mar. 31, 1981

[54] TWO COMPONENT OLIGOMERIC PHOSPHATE/ISOCYANATE COMPOSITION

[75] Inventors: Mohinder S. Chattha, Livonia; Henk Van Oene, Detroit, both of Mich.

[73] Assignee: Ford Motor Company, Dearborn, Mich.

[21] Appl. No.: 109,600

[22] Filed: Jan. 4, 1980

[51] Int. Cl.³ .................. C08G 59/14; C08G 18/58
[52] U.S. Cl. ............................ 528/72; 525/523; 525/528
[58] Field of Search ............ 525/523, 528; 528/72

[56] References Cited

U.S. PATENT DOCUMENTS

| 4,178,319 | 12/1979 | Chattha | 525/188 |
|---|---|---|---|
| 4,178,320 | 12/1979 | Chattha | 525/188 |
| 4,178,321 | 12/1979 | Chattha | 525/188 |
| 4,178,322 | 12/1979 | Chattha | 525/188 |
| 4,178,323 | 12/1979 | Chattha | 525/188 |
| 4,178,324 | 12/1979 | Chattha | 525/188 |
| 4,181,783 | 1/1980 | Chattha | 525/161 |
| 4,181,784 | 1/1980 | Chattha et al. | 525/161 |
| 4,181,785 | 1/1980 | Chattha et al. | 525/161 |
| 4,184,025 | 1/1980 | Chattha | 525/161 |
| 4,196,270 | 4/1980 | Chattha | 525/110 |

*Primary Examiner*—Earl A. Nielsen
*Attorney, Agent, or Firm*—Roger L. May; Olin B. Johnson

[57] ABSTRACT

Two component compositions particularly useful as high solids thermosetting coating compositions and molding compositions. Compositions comprise a first component comprising an oligomeric hydroxy functional phosphate ester prepared by reaction of a polyepoxide and an acid phosphate ester; and a second component comprising a isocyanate crosslinking agent.

11 Claims, No Drawings

TWO COMPONENT OLIGOMERIC PHOSPHATE/ISOCYANATE COMPOSITION

BACKGROUND OF THE INVENTION

This invention relates to two component compositions of the type comprising a first component which is a crosslinkable film forming or matrix forming component and a second component which is an isocyanate crosslinking agent for said first component. More particularly, the invention relates to thermosetting compositions of the aforementioned type wherein the first component is an oligomeric hydroxy functional phosphate ester and the second component is a polyisocyanate. Compositions within this scope of the invention are particularly useful as coating compositions, most particularly high solids coating compositions, and as molding compositions, most particularly compositions for reaction injection molding.

Acrylic polymers and polyesters comprise the major resin components in many automotive topcoats and primers as well as many molding compositions. Replacement of a —CH(CH₃)— by —P(CH₃)— or —(CH₃) P(O)— in such acrylics and polyesters does not change the general physical properties. However, it is known that flammability is significantly reduced. In addition to increased polarity and nonflammability, special effects can be assigned to various organophosphate groups. For example, it has been found that incorporation of organophosphorous esters (P-O-alkyl, P-O-aryl), both in the main chain of the polymer and in pendent groups leads to pronounced internal plasticization, which is accompanied by a lower softening temperature, and an increase in impact strength and a higher elongation at rupture. In addition to some of the above desirable properties, organophosphorous esters have also been reported to be radiation stabilizers and antioxidants.

It has now been discovered that a novel class of hydroxy functional organophosphorous oligomeric esters are particularly suitable for preparation of compositions which are crosslinked by aliphatic, cycloaliphatic or aromatic polyisocyanates. Compositions thus prepared afford high solids, low bake coatings with excellent hardness, adhesion, gloss, solvent resistance, impact strength and elongation, while also being particularly suitable for use in molding applications including reaction injection molding.

SUMMARY OF THE INVENTION

The compositions of this invention are thermosetting compositions comprising first and second components. The first component comprises an oligomeric hydroxy functional phosphate ester having a number average molecular weight of between about 500 and about 5000, preferably between about 1500 and 2500. The oligomeric hydroxy functional phosphate ester is prepared by reaction of: (i) a polyepoxide having a number average molecular weight of between about 120 and about 4500, which polyepoxide is selected from the group consisting of aliphatic, cycloaliphatic and aromatic polyepoxides; and (ii) a phosphate ester having the formula

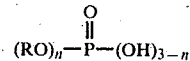

wherein n=1 to 2 and R is selected from an alkyl or aryl group containing between about 1 and about 20 carbon atoms. The phosphate ester and the polyepoxide are reacted in such amounts that there are between about 0.5 and about 1 acid groups per epoxy group in the reaction mixture. The second component comprises an isocyanate crosslinking agent selected from the group consisting of aliphatic, cycloaliphatic and aromatic polyisocyanates. The second component is admixed with the first component immediately prior to disposition of the composition for its intended use, e.g., spraying if used as a paint composition or injecting into a mold cavity if employed as a reaction injection molding material. The isocyanate crosslinking agent is employed in an amount such that there are between about 0.75 and about 1.2 reactive isocyanate groups per hydroxyl group in the first component of the composition.

RELATED APPLICATIONS

U.S. patent applications Ser. No. 109,597, filed concurrently herewith and entitled "OLIGOMERIC PHOSPHATE/AMINO COMPOSITION" teaches and claims a thermosetting composition employing an oligomeric hydroxy functional phosphate ester prepared in a manner similar to the oligomeric hydroxy functional phosphate ester of the subject application. The compositions disclosed therein are useful as high solids coating compositions and employ amino compounds as crosslinking agents. U.S. applications Ser. Nos. 945,030 now U.S. Pat. No. 4,181,784, issued Jan. 1, 1980 and 945,031 filed Sept. 22, 1978 now U.S. Pat. No. 4,181,785, issued Jan. 1, 1980, and entitled "HIGH SOLIDS COATING COMPOSITION ADAPTED FOR USE AS AUTOMOTIVE TOPCOAT—#1 and #2" respectively—disclose and claim high solids coating compositions suitable for automotive applications. Those compositions contain alkyl organophosphate esters similar to those used to prepare the oligomeric hydroxy functional organophosphate esters of the subject invention, as well as epoxy functional acrylic copolymers and amino compound crosslinking agents.

PRIOR ART

U.S. Pat. Nos. 3,960,979 and 4,018,848 to Khanna teach high solids coating compositions adapted for use as can coating materials. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexibilizing polyol.

The compositions of Khanna have the advantage of quick reaction and low application viscosity, but lack durability and, therefore, do not weather well. As such, the compositions of Khanna are not desirable for use as automotive topcoats.

DETAILED DESCRIPTION OF THE INVENTION

As indicated above, the compositions of the subject invention are particularly useful as high solids coating compositions for automotive applications and as molding compositions, particularly for reaction injection molding. The compositions provide high solids, low-bake coatings and molding compositions with excellent hardness, adhesion, gloss, solvent resistance, impact resistance and elongation.

Each of the components of the compositions of the invention generally summarized above, will be described hereinafter in greater detail.

Oligomeric Hydroxy Functional Phosphate Ester

The oligomeric hydroxy functional phosphate ester is a primary component of the first component of the compositions of the invention. The oligomeric hydroxy functional phosphate ester has a number average molecular weight of between about 500 and about 5000, preferably between about 1500 and about 2500. As indicated above, this oligomeric phosphate ester is prepared by reaction of a polyepoxide resin and a phosphate acid ester. The oligomeric phosphate ester so formed bears hydroxy functionality which is generated as a result of the reaction of the epoxide functionality with the acid group of the organophosphate ester reactant.

The polyepoxide resin employed in the preparation of the oligomeric phosphate ester has a number average molecular weight of between about 120 and about 4500, preferably between about 150 and about 2000. The polyepoxide is selected from the group consisting of aliphatic, cycloaliphatic and aromatic polyepoxides. As used herein, the term polyepoxide resin is intended to mean compounds or polymers containing two or more epoxide groups. However, di epoxides are most preferred for preparing oligomeric hydroxy functional phosphate esters used in compositions of the invention.

Among the numerous polyepoxide resins useful in preparing the oligomeric hydroxy functional phosphate ester are well known aliphatic, cycloaliphatic and aromatic polyepoxides, many of which are disclosed by U.S. Pat. Nos.: 3,404,018; 2,528,359; 2,528,360; 3,198,850; 3,960,979; and 4,018,848.

U.S. Pat. No. 3,404,018 discloses several particularly suitable types of polyepoxides including: (1) polyglycidyl ethers of polyhydric alcohols and polyhydric phenols; (2) epoxidized esters of ethylenically unsaturated monocarboxylic acids; (3) glycidyl esters of polybasic acids; (4) epoxidized esters of unsaturated monohydric alcohols and carboxylic acids; and (5) epoxidized polymers and copolymers of diolefins. Of course, many polyepoxides other than those recited in this or other referenced patents will be apparent to those skilled in the art.

The phosphate ester used in the preparation of the oligomeric hydroxy functional phosphate ester is itself an acid phosphate ester having the formula

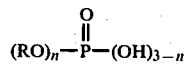

wherein n = 1 to 2 and R is selected from alkyl and aryl groups containing between about 1 and about 20 carbon atoms, preferably between about 2 and about 8 carbon atoms. Exemplary of the suitable alkyl and aryl groups which may be employed in the mono or diesters described above are: ethyl, propyl, buty., pentyl, hexyl, 2-ethylhexyl, heptyl, octyl, phenyl, p-methyl phenyl, stearyl.

In the preparation of the oligomeric hydroxy phosphate esters of the compositions of the invention, the acid phosphate ester and the polyepoxide resin are reacted in amounts such that there are between about 0.5 and about 1, preferably between about 0.7 and about 0.9 acid groups per epoxy group in the reaction mixture.

A second primary constituent which may be employed in the first component of the compositions of the invention is a hydroxy functional compound having a number average molecular weight of between about 120 and about 4000. This hydroxy functional additive may be included in the composition in an amount up to about 50 weight percent based on the total weight of the first component of the composition. This additive provides additional hydroxy functionality other than that present on the oligomeric hydroxy functional phosphate ester and is preferably employed in amounts ranging from about 5 to about 25 weight percent of the total of the first component of the composition.

By providing additional hydroxy functionality, these compounds help bring about a more desired crosslinked structure in the final cured product.

Numerous hydroxy functional compounds for use in the first component of compositions of the invention will be apparent to those skilled in the art. Suitable hydroxy functional materials are disclosed in the aforementioned Khanna patents as well as in U.S. Pat. No. 4,178,321 issued Dec. 11, 1979. Among the numerous suitable materials which may be employed are (i) hydroxy functional polyesters, (ii) hydroxy functional polyethers, (iii) hydroxy functional oligoesters, (iv) monomeric polyols and (v) hydroxy functional copolymers formed from monoethylenically unsaturated monomers, one or more of which bears hydroxyl functionality and which is included in the copolymer in amounts ranging from about 2.5 to about 30 weight percent of the copolymer.

The inclusion of hydroxy functional compound in the first component of the composition is particularly advantageous when it is intended to employ the composition as a molding composition, particularly when employing the same as a reaction injection molding composition. Among the most suitable hydroxy functional additives for use in these molding compositions are various low molecular weight polyols, particularly 1,4-butanediol, 1,3-butane diol, 2-ethyl-1,3-hexanediol and polyether glycols.

Polyisocyanate Crosslinking Agent

As mentioned above, the second component of the composition which is admixed with the first component immediately prior to disposition of the composition for its intended use, is an isocyanate crosslinking agent selected from the group consisting of aliphatic, cycloaliphatic and aromatic polyisocyanates. As used herein, the term "polyisocyanate" is intended to mean an isocyanate bearing two or more reactive isocyanate groups. While numerous polyisocyanates within the aforementioned generic description may be employed and while many such compounds will be apparent to those skilled in the art, it is preferred that aliphatic triisocyanates be employed.

Exemplary of the many polyisocyanates that may be employed, however, are: 1,6-hexandiisocyanate, isophoronediisocyanate, 1,4 cyclohexyldiisocyanate, toluene diisocyanate, tris-(4-isocyanate phenyl) phosphate, etc.

A particularly preferred aliphatic diisocyanate for use in compositions of the invention is an aliphatic, triisocyanate of the biuret type. One particularly preferred biuret type polyisocyanate is sold by Mobay Chemical Company under the trade name "Desmodur N-100". This resin is the reaction product of three moles of hexamethylene diisocyanate and one mold of water.

The polyisocyanate crosslinking agent of the invention is employed in amounts ranging from about 0.75 to about 1.2 reactive isocyanate groups per hydroxy functional group in the first component of the compositions.

Other Materials

In addition to the above, other materials may be included in the compositions of the invention. These materials may be included in either of the two components of the composition, but preferably are included in the first component. These materials include catalysts, antioxidants, U.V. absorbers, solvents, surface modifiers, wetting agents, pigments, etc. Various materials falling within the aforementioned categories will be obvious to those skilled in the art. Still other materials other than those enumerated above may be incorporated depending upon the particular end use for the compositions.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

In a four-necked round bottom flask equipped with a dropping funnel, a stirrer and a thermometer, 315 grams of bis-(3,4-epoxy-6-methylcyclohexylmethyl) adipate (Araldite CY 178) in 108 ml of n-butyl acetate are placed under nitrogen. Butyl acid phosphate (1+2a), 199 grams, is taken up in the dropping funnel and is added dropwise with continuous stirring. An exothermic reaction occurs, the temperature is allowed to rise to 60° C. and then the addition is regulated to maintain this temperature. After the addition is complete, the reaction mixture is stirred for one hour while maintaining the temperature at 60° C. The molecular weight of the product is determined by Gel Permeation Chromatography (FIG. 1) and is found to be 1800. Seventy parts of the above adduct are mixed with 45 parts of butyl acetate and 0.51 parts of dibutyltin dilaurate. Forty-five parts of polyisocyanate L2291 (Mobay Chemical Company) are added to the above mixture and the resulting formulation is well shaken. This paint is applied by spraying with a suction gun to primed steel panels in three coats; intermediate flash time is one minute and the final flash is five minutes. The panels are baked at 100° C. for 20 minutes to obtain coatings with excellent hardness, adhesion and solvent (xylene and methyl ethyl ketone) resistance.

EXAMPLE 2

One hundred and five parts of the adduct from Example 1 are dissolved in 140 parts of methyl amyl ketone and 455 parts of titanium dioxide are added under agitation to this solution. The resulting mixture is whipped with a Cowl's blade at 90 cycles per second for 15 minutes to obtain a Hegman grind fineness of 7.5. The resulting mill base is filtered through a coarse filtering cloth.

Forty eight parts of the above millbase, 32.8 parts of the adduct from Example 1, 20 parts of butyl acetate and 0.29 parts of dibutyltin dilaurate are taken up in a plastic bottle. In a separate bottle, 26 parts of polyisocyanate L2291 (Mobay Chemical Corp.) are dissolved in 19 parts of methyl amyl ketone and the resulting solution is added to the first bottle. The formulation is well shaken and is spray applied to primed steel panels. The panels are baked at 100° C. for 20 minutes to obtain white coatings with excellent physical properties.

EXAMPLE 3

Preparation of the hydroxy resin is carried out as described in Example 1 by employing 315 parts of bis-(3,4-epoxy-6-methylcyclohexylmethyl) adipate (Araldite CY178), 160 parts of 2-ethylhexyl phosphate (eq. wt. 150) and 118 parts of n-butyl acetate.

Fifty-two (52) parts of the above adduct are mixed with 37 parts of methyl amyl ketone and 0.38 parts of dibutyltin dilaurate. thirty-five parts of polyisocyanate L2291 (Mobay Chemical Corp.) are added to the above solution and the resulting formulation is well shaken. It is applied with a suction gun in three coats to primed steel panels. The panels are baked at 100° C. for 20 minutes to obtain coatings with excellent gloss, hardness, adhesion and solvent (xylene and methyl ethyl ketone) resistance.

EXAMPLE 4

A hydroxy acrylic copolymer is prepared from the following monomers:

|  | Wt. Grams |
| --- | --- |
| Butyl methacrylate | 500 |
| Hydroxypropyl methacrylate | 250 |
| Methyl methacrylate | 200 |
| Styrene | 50 |

Fifty (50) grams tert-butyl perbenzoate is added to the above monomer mixture and the resulting solution is added dropwise to 750 grams of refluxing methyl amyl ketone under nitrogen. The heating and stirring is continued for half an hour after the addition is complete and then two grams of tertbutyl perbenzoate are added portionwise to the reaction mixture. The reaction mixture is refluxed for an additional half an hour and is then allowed to cool to room temperature.

Fifty (50) parts of the above polymer solution and seventy parts of the adduct from Example 1 are dissolved in 42 parts of butyl acetate and 0.71 parts of dibutyltin dilaurate are added to this solution. Forty-five (45) parts of polyisocyanate L2291 (Mobay Chem. Corp.) and 6.25 parts of isophosonediisocyanate are added to the above solution; the resulting formulation is applied by spraying with a suction gun to primed steel panels. The panels are baked at 95° C. for 20 minutes to obtain coatings with excellent physical properties.

EXAMPLE 5

Sixty-five (65) parts of the polymer solution from Example 4 are mixed well with 8 parts of aluminum flakes (65% in naphtha) and 70 parts of the adduct from Example 1 and 46 parts of butyl acetate are added to this mixture. Dibutyltin dilaurate (0.75 parts) and polyisocyanate L2291 from Mobay Chemical Co. (57.8 parts) are added to the above mixture and the resulting formulation is applied by spraying to primed steel panels in three coats; intermediate flash time is one minute and the final flash is five minutes. The panels are baked at 92° C. for 20 minutes to obtain silver metallic coatings with excellent physical properties.

EXAMPLE 6

In the formulation described in Example 5, Isophoronediisocyanate Adduct T1890 (V) (VEBA CHEMIE AG), 94 parts, is substituted for the isocyanate used therein. The resulting formulation is applied by spraying with a suction gun to primed steel panels in three coats; intermediate flash time is one minute and the final flash is five minutes. The panels are baked at 95° C. for 20 minutes to obtain silver metallic coatings with excellent gloss, hardness, adhesion and solvent resistance.

EXAMPLE 7

Seventy (70) parts of the hydroxyphosphate adduct from Example 1 and 11 parts of caprolactone based triol PCP0300 (Union Carbide) are dissolved in 50 parts of butyl acetate and 0.55 parts of dibutyltin dilaurate are added to this solution. Fifty-six (56) parts of polyisocyanate L2291 (Mobay Chemical Co.) are added to the above solution and the resulting formulation is applied by spraying to primed steel panels. The panels are baked at 97° C. for 20 minutes to obtain coatings with excellent physical properties.

EXAMPLE 8

Fifty-four (54) parts of the millbase from Example 2, 35 parts of the polymer solution from Example 4, 8 parts of Pluracol Polyol P410, 21 parts of butyl acetate and 0.3 parts of dibutyltin dilaurate are taken up in a plastic bottle. In a separate bottle, 21.2 parts of polyisocyanate L2291 (Mobay Chemical Corporation) are dissolved in 8 parts of butyl acetate and added to the above mixture. The resulting formulation is applied by spraying to primed steel panels, which are baked at 110° C. for 16 minutes to obtain coatings with excellent gloss, hardness, adhesion and solvent resistance.

EXAMPLE 9

A hydroxyphosphate resin was prepared as described in Example 1 by employing 500 grams of bisphenol-A diglycidyl ether (EPON 828, Shell Chem. Co.), 256 grams of 2-ethylhexyl phosphate (eq. wt. 150) and 189 grams of butyl acetate. Fifty (50) parts of this resin are mixed with nine parts of bis-(hydroxypropyl) azelate, ten parts of methyl amyl ketone and 0.29 parts of dibutyltin dilaurate. Thirty-three (33) parts of polyisocyanate L2291 (Mobay Chem. Corp.) are dissolved in 10 parts of methyl amyl ketone and added to the above mixture. The resulting formulation is applied by spraying to primed steel panels which are baked at 110° C. for 15 minutes to obtain coatings with excellent gloss, hardness, adhesion and solvent resistance.

EXAMPLE 10

Three hundred (300) grams of 1,4-butanediol diglycidyl ether are dissolved in 152 grams of butyl acetate and reacted with 301 parts of 2-ethylhexylphosphate (eq. wt. 15) as described in Example 1. Eighty-three (93) parts this adduct are mixed with twelve parts of methyl amyl ketone and 0.4 parts of dibutyltin dilaurate. A solution of 67 parts of polyisocyanate L2291 (Mobay Chem. Corp.) in 18 parts of methyl amyl ketone was added to the above mixture and the resulting formulation is applied by spraying to primed steel panels. The panels are baked at 105° C. for 20 minutes to obtain coating with excellent hardness, adhesion, gloss and solvent resistance.

In view of this disclosure, many modifications of this invention will be apparent to those skilled in the art. It is intended that all such modifications which fall within the true scope of this invention be included within the terms of the appended claims.

EXAMPLE 11

Preparation of hydroxy oligophosphate was carried out from 152 grams Araldite CY-178, 85 grams of butyl acid phosphate and 75 grams 2-ethyl-1,3-hexanediol as solvent.

Fifty-five (55) parts of the above reaction mixture are mixed with 0.5 parts of dibutyl tindilaurate and 35 parts of triinecyanate L2291 (Mobay Chem. Co.). The formulation was quickly poured into a mold to obtain ring type and cylindrical articles. The molds were placed in an oven at 90° C. for 20 minutes to produce samples with excellent hardness, toughness and solvent (xylene and methyl ethyl ketone) resistance.

EXAMPLE 12

Preparation of hydroxy oligophosphate was carried out as described in Example 1 by employing 120 grams Araldite CY-178, 50 ml n-butyl acetate and 117 grams of phenyl acid phosphate.

Fifty (50) parts of the above oligomer solution, 0.6 parts dibutyl tinadilaurate, 15 parts Desmodur N-100 (Mobay Chem. Co.) are 2.6 parts toluene diisocyanate are dissolved in 18 parts of n-butyl acetate. The resulting formulation is applied to primed steel panels by drawing. The panels are baked at 106° C. for 20 minutes to obtain coatings with excellent hardness, adhesion and solvent (xylene and methyl ethyl ketone) resistance.

In view of this disclosure, many modifications of this invention will be apparent to those skilled in the art. It is intended that all such modifications that fall within the true scope of this invention will be included in the terms of the appended claims.

I claim:
1. A thermosetting composition comprising:
   I. A first component comprising an oligomeric hydroxy functional phosphate ester having a number average molecular weight of between about 500 and about 5000 and being prepared by reaction of:
   (a) polyepoxide resin having a number average molecular weight of between about 120 and about 4500 and being selected from the group consisting of aliphatic, cycloaliphatic and aromatic polyepoxides; and
   (b) phosphate acid ester having the formula

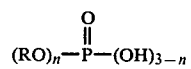

wherein n=1 to 2 and R is selected from alkyl and aryl groups containing between about 1 and about 20 carbon atoms, said phosphate ester and said polyepoxide being reacted in such amounts that there are between about 0.5 and about 1 acid groups per epoxy group in said reaction mixture; and
   II. A second component comprising isocyanate crosslinking agent selected from the group consisting of aliphatic, cycloaliphatic and aromatic polyisocyanates, said second component being incorporated and mixed with said first component immediately prior to disposition of said composition for its intended use in an amount such that there are between about 0.75 and about 1.2 reactive isocyanate groups per hydroxyl group in said first component.

2. A composition in accordance with claim 1 wherein said oligomeric hydroxy functional phosphate ester has a number average molecular weight of between about 1500 and about 2,000 and said polyepoxide used to prepare said oligomeric hydroxy functional phosphate ester is a diepoxide.

3. A composition in accordance with claim 2 wherein said polyepoxide used to prepare said oligomeric hydroxy functional phosphate ester is a cycloaliphatic diepoxide.

4. A composition in accordance with claim 1 wherein said R group of said phosphate acid ester used to prepare said oligomeric hydroxy functional phosphate is selected from alkyl or aryl groups containing between about 2 and about 8 carbon atoms.

5. A composition in accordance with claim 1 wherein said phosphate acid ester and said polyepoxide used to prepare said oligomeric hydroxy functional phosphate ester are reacted in such amounts that there are between about 0.7 and about 0.9 acid groups per epoxy group in said reaction mixture.

6. A composition in accordance with claim 1 wherein said second component comprises an aliphatic polyisocyanate.

7. A composition in accordance with claim 6 wherein said second component comprises an aliphatic triisocyanate.

8. A composition in accordance with claim 7 wherein said second component comprises an aliphatic triisocyanate of the biuret type.

9. A composition in accordance with claim 1 wherein said first component includes up to about 50 weight percent based on the total weight of said first component of a hydroxy functional compound having a number average molecular weight of between about 120 and about 4000.

10. A composition in accordance with claim 9 wherein said hydroxy functional additive is selected from the group consisting of (i) hydroxy functional polyesters, (ii) hydroxy functional polyethers, (iii) hydroxy functional oligoesters, (iv) monomeric polyols, and (v) hydroxy functional copolymers formed from monoethylenically unsaturated monomers, one or more of which bears hydroxyl functionality and which is included in said copolymer in amounts ranging from about 2.5 to about 30 weight percent of said copolymer.

11. A thermosetting composition comprising
I. A first component comprising
(A) An oligomeric hydroxy functional phosphate ester having a number average molecular weight of between about 1500 and about 2500 and being prepared by reaction of
(a) an epoxide having a number average molecular weight of between about 150 and about 2000 and being selected from the group consisting of aliphatic cycloaliphatic and aromatic epoxides; and
(b) phosphate acid ester having the formula

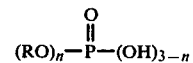

wherein n=1 to 2 and R is selected from alkyl groups having 2 to 8 carbon atoms, said phosphate ester and said polyepoxide being reacted in such amounts that there are between about 0.7 and about 0.9 acid groups per epoxy group in said reaction mixture; and
(B) between about 5 and about 25 weight percent based on the total weight of (A) and (B) of a hydroxy functional compound having a number average molecular weight of between about 120 and about 4000.

UNITED STATES PATENT AND TRADEMARK OFFICE
CERTIFICATE OF CORRECTION

PATENT NO. : 4,259,472
DATED : March 31, 1981
INVENTOR(S) : Mohinder S. Chattha et al It is certified that error appears in the above-identified patent and that said Letters Patent are hereby corrected as shown below:

At column 4, line 66, cancel "diisocyanate" and replace with --polyisocyanate--; and At column 10, in claim 11, beginning at line 39, after "4000" insert --; and II. A second component comprising isocyanate crosslinking agent selected from the group consisting of aliphatic, cycloaliphatic and aromatic polyisocyanates, said second component being incorporated and mixed with said first component immediately prior to disposition of said composition for its intended use in an amount such that there are between about 0.75 and about 1.2 reactive isocyanate groups per hydroxyl group in said first component--.

Signed and Sealed this

Twenty-first Day of February 1984

[SEAL]

Attest:

GERALD J. MOSSINGHOFF

Attesting Officer   Commissioner of Patents and Trademarks